Feb. 12, 1946.  C. E. MORLEY ET AL  2,394,799
VENTILATED SPECTACLE FRAME
Filed April 24, 1944

INVENTORS
CHARLES E. MORLEY
BY HAROLD S. DAVIS
ATTORNEYS

Patented Feb. 12, 1946

2,394,799

UNITED STATES PATENT OFFICE 2,394,799

VENTILATED SPECTACLE FRAME

Charles E. Morley and Harold S. Davis, Detroit, Mich.

Application April 24, 1944, Serial No. 532,406

2 Claims. (Cl. 2—14)

This invention relates to an improved spectacle or goggle construction, and has for its object an improved organization and contouring of the component parts by means of which the eyes of the wearer may be given a maximum of protection against the ingress of dust particles and the like, while at the same time affording adequate ventilation for that portion of the surface of the wearer's nose and face thus protected.

Another purpose of our invention is to permit easy adjustability of the lens frame thus constructed to conform with variant distances between the eye centers and the brow contours of different users, adjustment from one position to the other being possible with a minimum of effort and an assurance that the adjustment when effected will be permanent unless and until intentionally changed.

The basic adjustment features of our invention are illustrated and described in our pending application for Letters Patent Serial No. 488,666, filed May 27, 1943, but alternative and substitutable constructions for certain of the component parts are herein particularly emphasized.

In the drawing:

Figure 7 is a side elevational view of the built-up nose bridge construction shown in Figure 2, as applied to a sketched-face contour, bringing out the ventilation feature above referred to.

A and B represent the complementary lens-supporting frame pieces which when assembled and suitably correlated, constitute the goggle structure herein contemplated. Along the outer edge of each, as at $A^6$ and $B^6$ respectively, is positioned a curvate skirting or cheek-engaging part, designed, cooperatively with the glass lenses, to protect the wearer's eyes against the access of dust particles, as well as to protect the eyes of a man engaged in welding work from the sight-impairing light rays which this kind of work involves.

Attached to the rearward portion of each of these skirting or protective pieces $A^6$ and $B^6$ are suitable means as for example, the temple pieces C for holding the lens-supporting structure firmly in position on the wearer's face.

Figure 1:
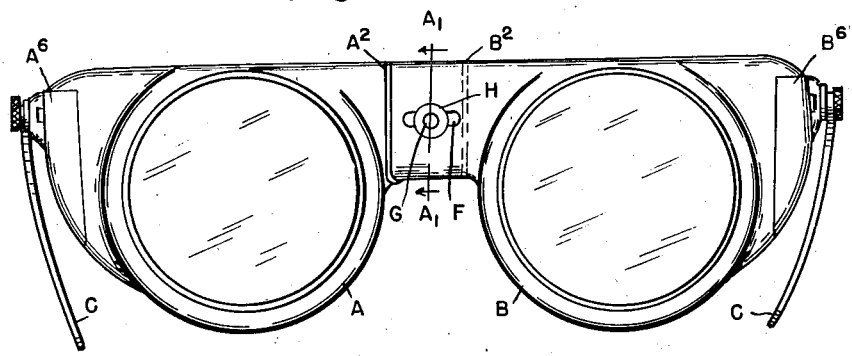
Figure 1 is a front elevational view of a pair of goggles or spectacles constructed in accordance with our present invention.
Figure 2:
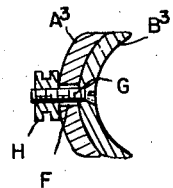
Figures 2, 3, 4, 5 and 6 are sectional elevational views taken along the line $A_1$ of Figure 1, and looking in the direction of the arrow there shown, illustrating various possible contourings of the built-up nose-engaging piece, each centering around the idea of affording a ventilation space on either side of and across the wearer's nose as the goggles are positioned thereover.

Each of these lens-supporting frames A and B is provided with a complementary lateral projection as $A^2$ and $B^2$, each of which is, in one specific form or another, curvate as shown at $A^3$ and $B^3$ respectively in Figure 2.

Figure 3:
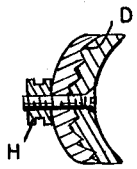
Figure 4:
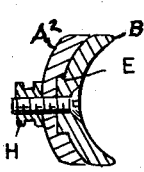

In Figure 3 the adjacent nesting faces of these frame extensions are serrated, as at D, whereas in Figure 4, the two nesting sections $A^2$ and $B^2$ are formed with mating channeled portions as E.

Figure 5:
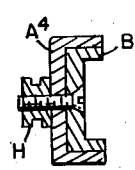
Figure 6:
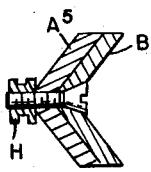

In Figure 5, in place of cross-sectionally curvate frame extension portions, angular channel pieces as $A^4$ and $B^4$ are provided, while in Figure 6 cross sectional V frame extensions as $A^5$ and $B^5$ are employed.

In whatever curvature these complementary frame extension pieces are embodied, their overlapping portions are provided with matching slots F, which are traversed by the threaded stem G, on which rides the milled nut H. Thus at whatever lens-center distance it is desired to space the constituent frame pieces A and B, depending upon the face breadth or otherwise of the wearer, the lens frame when adjusted may be held in unchangeable relation to one another.

Figure 7:
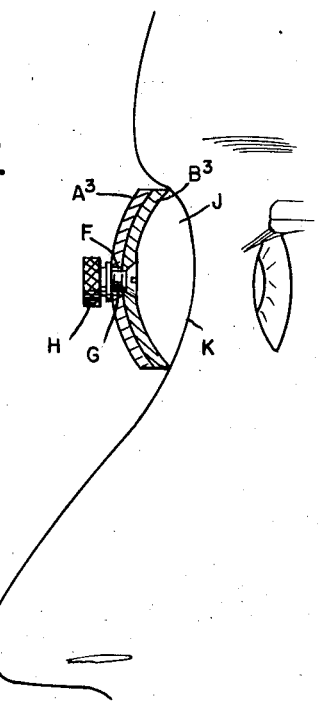

It will be noted that in any of the forms of mutually overengaging bridge pieces, their outward curvature or convexity is, viewed cross sectionally, such as to afford a very definite ventilation space as J between the inner one of them and the nose or facial contour of the wearer as outlined at K in Figure 7. This cross ventilation space immediately over the nose is connected at either end with the clearance space provided by the fact that the relative position of the wearer's eye is distinctly back of the plane of the wearer's nose and his adjacent face surface. This therefore affords a complete cross ventilation for the portion of the wearer's nose and face surface which is ordinarily directly engaged by the nose bridge portion of a spectacle or goggle construction, and is of particular utility in offsetting the tendency to additional perspiration of the skin in that region, with accompanying condensation of moisture on the lens.

It is of course to be understood that we do not wish our disclosure to be considered as limited to the particular form of threaded stem and milled nut herein shown for effecting the clamping together of the lens frame pieces, since any equivalent construction which will lend itself to adequate rigidity in this respect is to be considered within the scope of our invention.

What we claim is:

1. A protective and adjustable goggle assembly, comprising a pair of complementarily contoured lens-supporting frames, each having a longitudinally serrated projecting portion adapted to be placed in overlapping relation to its companion projection on the other frame, and each projection being also contoured to afford a ventilation space adjacent the wearer's nose, and manually operable correlating means whereby said overlapping projections are held in desired adjusted relation.

2. An adjustable lens frame for spectacles, comprising a pair of initially separate units having complementarily positioned lateral projections, the adjacent surfaces of each of which are longitudinally serrated and traversed by partially overlapping slots, and the cross-sectional contour of each of which projections is outwardly convexed to provide ventilating air spaces adjacent the wearer's nose, and holding means operatively engaging such laterally projecting portions, whereby they and their corresponding lens-supporting frames may be locked in desired position of extension or retraction to accord with the eye positions of the individual user.

CHARLES E. MORLEY.
HAROLD S. DAVIS.